(12) United States Patent
Petersen et al.

(10) Patent No.: US 10,695,647 B2
(45) Date of Patent: Jun. 30, 2020

(54) POSITION TRACKING AT SPORTS EVENTS (71) Applicant: RACE RESULT AG, Pfinztal (DE)

(72) Inventors: Sönke Petersen, Karlsruhe (DE); Nikias Klohr, Stutensee (DE)

(73) Assignee: RACE RESULT AG, Pfinztal (DE)

( * ) Notice: Subject to any disclaimer, the term of this patent is extended or adjusted under 35 U.S.C. 154(b) by 23 days.

(21) Appl. No.: 15/776,635

(22) PCT Filed: Nov. 21, 2016

(86) PCT No.: PCT/EP2016/078333
§ 371 (c)(1),
(2) Date: May 16, 2018

(87) PCT Pub. No.: WO2017/089306
PCT Pub. Date: Jun. 1, 2017

(65) Prior Publication Data
US 2018/0326285 A1  Nov. 15, 2018

(30) Foreign Application Priority Data
Nov. 23, 2015 (DE) .......................... 10 2015 015 036

(51) Int. Cl.
*A63B 71/06* (2006.01)
*G01S 13/75* (2006.01)
(Continued)

(52) U.S. Cl.
CPC ...... *A63B 71/0616* (2013.01); *A63B 24/0021* (2013.01); *G01S 13/75* (2013.01);
(Continued)

(58) Field of Classification Search
CPC ............ A63B 71/0616; A63B 24/0021; A63B 2024/0025; A63B 2225/15;
(Continued)

(56) References Cited

U.S. PATENT DOCUMENTS

| | | | | |
|---|---|---|---|---|
| 6,150,948 | A * | 11/2000 | Watkins | ............... G06K 7/0008 340/693.3 |
| 2005/0234778 | A1* | 10/2005 | Sperduti | ............... G06Q 20/20 705/22 |

(Continued)

FOREIGN PATENT DOCUMENTS

| | | |
|---|---|---|
| DE | 10 2009 053 872 | 5/2011 |
| EP | 2 357 446 | 5/2016 |

OTHER PUBLICATIONS

Translation of the International Preliminary Report on Patentability for International Application No. PCT/EP2016/078333, dated Jun. 7, 2018, 9 pages.

(Continued)

*Primary Examiner* — Corbett B Coburn
(74) *Attorney, Agent, or Firm* — Foley & Lardner LLP (57) ABSTRACT

The present invention relates to a mobile transponder (12) for timing and position tracking, including: a reception unit (26) for receiving a message (50) when a measuring point (18) is passed; a processor (28) for evaluating the message to activate a tracking mode if the message includes activation information (54), and to determine a passing time at which the measuring point is passed if the message includes timing information (52); and a transmission unit (30) for periodically transmitting a tracking packet (56) with identity information (58) for reception by a tracking station (20) having a known position within communication range (22) if the tracking mode is activated, and for forwarding the passing time to the measuring point. The present invention further relates to a system and a method for timing and position tracking as well as to a use of the transponder and of the system for timing and position tracking of participants at a sports event.

16 Claims, 4 Drawing Sheets

(51) Int. Cl.
*G06K 7/10* (2006.01)
*G06K 19/07* (2006.01)
*G07C 1/24* (2006.01)
*G01S 13/88* (2006.01)
*A63B 24/00* (2006.01)

(52) U.S. Cl.
CPC .......... *G01S 13/88* (2013.01); *G06K 7/10297* (2013.01); *G06K 7/10425* (2013.01); *G06K 7/10475* (2013.01); *G06K 19/0723* (2013.01); *G07C 1/24* (2013.01); *A63B 2024/0025* (2013.01); *A63B 2225/15* (2013.01); *A63B 2225/20* (2013.01); *A63B 2225/54* (2013.01)

(58) Field of Classification Search
CPC . A63B 2225/20; A63B 2225/54; G01S 13/75; G01S 13/88; G06K 7/10297; G06K 7/10425; G06K 7/10475; G06K 19/0723; G07C 1/24
See application file for complete search history.

(56) References Cited

U.S. PATENT DOCUMENTS

| | | | |
|---|---|---|---|
| 2006/0244594 A1* | 11/2006 | Malone | G06K 19/0717 340/572.1 |
| 2008/0125097 A1* | 5/2008 | Siagri | H04L 51/38 455/413 |
| 2011/0043335 A1* | 2/2011 | Feierle | G06K 19/0723 340/10.1 |
| 2012/0319822 A1* | 12/2012 | Hansen | A63B 71/0616 340/10.1 |
| 2013/0231760 A1* | 9/2013 | Rosen | G06F 17/40 700/91 |
| 2013/0285794 A1 | 10/2013 | Hansen | |

OTHER PUBLICATIONS

International Search Report and Written Opinion for International Application No. PCT/EP2016/078333, dated Feb. 8, 2017, 10 pages.

* cited by examiner

POSITION TRACKING AT SPORTS EVENTS

CROSS-REFERENCE TO RELATED APPLICATIONS

This application is a U.S. 371 National Stage Entry Application of International Application No. PCT/EP2016/078333, filed Nov. 21, 2016, which claims priority to German Application No. 102015015036.7, filed Nov. 23, 2015. German Application No. 102015015036.7 is hereby incorporated by reference in its entirety.

BACKGROUND

The present invention relates to a transponder, a system and a method for timing and position tracking.

In the field of timing at sports events, for example at running events, marathons, bicycle races, skiing races, car races, horse races or other similar events, timing of participants' start, finish, and split times plays an important role. In prevailing timing systems, oftentimes a person, a vehicle or an animal, whose time is to be measured, carries a radio element (e.g. an active or passive RFID tag) for non-contact and automated timing. Runners, for instance, may carry radio elements that are integrated in a starting number or attached to the lace of a shoe. In the case of cycling events, it is possible to attach respective radio elements to the handlebar of a bicycle; in other vehicles a radio element may be attached to the vehicle body.

At start, finish, and split time positions along a track, measuring points are provided that allow for a radio element to be detected and/or to be communicated with. For this purpose, a measuring point in particular comprises an antenna and a respective evaluation unit for controlling the antenna and for processing exchanged signals. The measuring point records points in time at which a certain radio element is in its vicinity and/or passes the measuring point. The determination of a passing time, i.e. the moment at which the radio element passes the measuring point, may be carried out in several ways on the basis of messages exchanged between radio element and measuring point while the radio element is within communication range of the measuring point. For example, the calculation may be done on the basis of an evaluation of signal strengths of exchanged messages. The determined passing times are then communicated to a central evaluation point. By taking into account and evaluating the various registered passing times, time registration becomes possible.

In this context, a transponder particularly designates a radio element that is able to transmit as well as to receive signals. On the one hand, passive RFID systems are to be mentioned in this regard that do not have an energy source of their own and that transmit their own identification information (ID) in response to a stimulus from a base station. On the other hand, active RFID systems usually have their own energy supply and thereby allow for a comparatively higher degree of data processing in the transponder. Usually, active RFID systems allow for a higher precision in timing.

In addition to timing, position tracking (herein also simply referred to as tracking) of the participants is also often desired at sports events. In particular in the professional sector, for example at marathon events, but also in popular sports, for example at triathlon and Iron Man events, this registration and monitoring of participants' positions (tracking) can generate important additional information both for the spectators and the athletes. Position tracking is to be understood as position monitoring or localization of transponders that are, for example, carried by athletes.

In this context, one approach is to equip participants with a so-called tracker for position tracking in addition to the transponder. Usually, such trackers comprise a GPS module for position detection as well as a GSM module for transmitting the position to the central evaluation point at regular time intervals. What is disadvantageous about this solution is the relatively high energy demand which makes a relatively big battery necessary. In the area of professional sports, for example, participants often desire to reduce the weight of the equipment carried along. In the area of Olympic sports, for example, an upper limit of 18 grams for the weight of the transponder is set by officials, whereas usual GPS trackers often weigh around 60 grams.

If the option is provided to activate and deactivate the tracker manually in order to save energy, this often has the effect that at least part of the participants neglect to activate the tracker at all or activate or deactivate it too soon or too late, which makes it impossible to track their positions reliably. Apart from this, if rechargeable batteries are used, the process of recharging often poses a huge challenge when a plurality of trackers is used at a big event. In addition, an interface for recharging a battery usually requires a plug, which may compromise the watertightness and robustness of the solution. Moreover, the simultaneous use of GSM technology by the many participants that are in a start or finish area at the same time may cause a network overload. Finally, the initialization of the event is made more complicated as all participants need to be provided with another device in addition to the transponder, which devices each need to be allocated.

A further approach for position tracking of athletes is the additional handing out of transmitters to the participants of the sports event, which regularly transmit (radio) signals. These signals are received by base stations along the track, wherein localization can be further improved by triangulation of the received signals. What is disadvantageous here is that an additional device is also necessary, which has to be carried by the athlete. Here, the same disadvantages as with the use of a tracker as described above occur, which result from the use of a (rechargeable) battery, from the use of an additional device and/or from the separate handling.

A further approach is to realize a tracking on the basis of the transponder that is carried along anyway. For this purpose, several measuring points for the detection of split times are provided along the track. What is disadvantageous here is that the effort regarding equipment and personnel and thus the cost is considerable when such time measuring points are installed as it is necessary to realize a dense grid of many measuring points (e.g. one measuring point per kilometer).

EP 2 357 446 A2 discloses multi-sensor monitoring systems and methods. In various ways, GPS data are used, and athletes, and/or devices used by the athletes, are provided with data and information. The disclosed systems and methods may provide route information to athletes and/or their coaches, for instance for pre-planning, goal setting and calibration purposes. Such systems and methods may optionally also provide real time information while the event is going on, for example to assist in reaching pre-set goals. Additionally, data and information collected by such systems and methods may be used by athletes and their coaches for post-event analysis, for example to evaluate the performance and to assist in improving future performance.

US 2013/0231760 A1 discloses an approach for providing event feedback information about participants of an event. A participant carries a participant device, which, at passing a checkpoint, receives event time information as well as identifier information via RFID. Based on this and on participant elapsed time information, timing information is displayed for the participant. On the one hand, the participant carries a wrist-worn device and on the other hand, s/he carries an RFID device at his or her foot. The foot-worn device serves for communication with an RFID reader. As soon as timing information is received from a checkpoint, the information is forwarded to the wrist-worn device in an "internal" transmission procedure with the help of an ANT transceiver. None of the participant devices is localized along the track.

US 2013/0285794 A1 discloses a system as well as a method for tracking a position of a participant during an event. A participant carries an RFID tag that is connected to a localization tag. This localization tag receives localization data from a localization source, in particular from a GPS system, and transmits these data periodically via a detection system of a detection point to a timing system. The participant's position is determined and transmitted in the participant's localization tag. The comparatively high energy demand of the GPS receiver as well as the use of a localization tag that runs separately from the RFID tag is tolerated. The position of the detection point is not known.

In summary, no practical and satisfying solution for realizing position tracking at such events is at yet available. All previous solutions have disadvantages regarding manageability (effort for initialization and/or installation, charging of numerous devices, etc.), error-proneness (participants need to be entered manually, charging necessary due to high energy consumption, network overload, etc.), robustness (charging plug necessary because of high energy consumption so that no watertight housing can be realized, etc.), and/or costs (system costs, effort for installation, transport costs, etc.) so that tracking has only been used rarely until now. It is therefore the object of the present invention to provide a possibility for timing and position tracking. In particular, it is the object of the present invention to improve the systems in the prior art regarding energy consumption, ease of use, reliability and system costs.

SUMMARY

According to an aspect, for achieving this objective, the present invention relates to a mobile transponder for timing and position tracking, including:

a reception unit for receiving a message when a measuring point is passed;

a processor for evaluating the message to activate a tracking mode if the message includes activation information, and to determine a passing time at which the measuring point is passed if the message includes timing information; and a transmission unit for periodically transmitting a tracking packet with identity information for reception by a tracking station having a known position within communication range if the tracking mode is activated, and for forwarding the passing time to the measuring point.

According to a further aspect, the present invention relates to a system for timing and position tracking, including:

a mobile transponder as described above; at least one measuring point for wireless transmission of timing information and activation information in at least one message to the transponder when the at least one measuring point is passed;

a tracking station with known position for receiving the tracking packet from a transponder within communication range and for transmitting a detection packet with identity information and position information of the tracking station to a central station; and a central station for determining a position of the transponder on the basis of the detection packet.

According to a further aspect, the present invention relates to a method for timing and position tracking, with the steps:

receiving a message when a measuring point is passed;

evaluating the message to activate a tracking mode if the message includes activation information, and to determine a passing time at which the measuring point is passed if the message includes timing information; and periodically transmitting a tracking packet with identity information for reception by a tracking station having a known position within communication range if the tracking mode is activated, and forwarding the passing time to the measuring point.

According to an aspect, the invention relates to a computer program product with a data carrier on which program code is stored, which is configured to carry out a method with the steps as described above when the program code is executed.

Preferred embodiments of the invention are described in the dependent claims. It is understood that the transponder, the method, the system, and the computer program product may be designed in accordance with the embodiments described for the transponder or for the system, respectively, in the dependent claims.

The reception unit of the transponder according to the invention communicates wirelessly with a measuring point as soon as the transponder is within a communication radius of the measuring point. Upon passing, i.e. while the transponder is within the communication radius of the measuring point, the transponder receives at least one message from the measuring point. On the basis of the processing of this message—depending on whether the message includes timing information and/or activation information—timing and/or activation of position tracking is carried out.

Mostly, several messages are received for timing, on the basis of which a passing time can be determined in the transponder. The passing time or the calculation of the passing time, respectively, mostly corresponds to the determination of a point in time or of a message at which the distance between the measuring point and the transponder is minimal, i.e. when, for instance, a start or finish line is crossed. The passing time is transmitted to the measuring point for further processing with the help of a transmission unit of the transponder. Thus, the measuring point comprises a transmission unit on the one hand, with which the message is transmitted, and a reception unit on the other hand, with which the passing time of a passing transponder is received.

For position tracking, the processor is configured to activate a tracking mode if the message includes activation information. When this tracking mode is activated, a tracking packet is periodically transmitted by the transmission unit of the transponder. The tracking packet is preferably transmitted wirelessly as a broadcast packet, i.e. as a message to all possible receivers within a communication radius of the transmission unit. Preferably, the tracking packet is transmitted to a special tracking broadcast address which is logically completely separated from the message traffic for timing. It can thus be ensured that even a large number of transponders with activated tracking mode, which periodically transmit tracking packets, does not jeopardize the actual timing (or the transmission of passing times, respectively). The tracking packet includes identity information of the transponder. This identity information corresponds to a unique identifier of the transponder and allows for the transponder to be identified or to be distinguished from other transponders, respectively. The tracking packet is received by a tracking station with a known position along the track. On the basis of the identity information, the tracking station can determine from which transponder the tracking packet originates. In other words, the presence of the transponder in a communication radius of the tracking station is detected. No signalization from a measuring point to the transponder is necessary so that the comparatively time-consuming installation of a measuring point is not required.

A known position of the tracking station is to be understood as a position that can be unambiguously located relative to the track and/or relative to the surroundings. In other words, the (absolute or relative) geographical coordinates of the tracking station are known. Preferably, for determining its position, the tracking station has a GPS or other satellite receiver. It is also possible that the position of the tracking station is manually or automatically preset during an initialization process, e.g. by operating personnel during placing. The position of a tracking station may also be determined and/or allocated later. In this case, the tracking station only transmits identification information (ID of the tracking station) based on which it can be retrospectively allocated a position, preferably in the central station. For instance, the position may then be determined manually with the help of a map. This can be advantageous in particular in an inside scenario inside a building with no or limited GPS reception or in a mixed inside/outside scenario.

The tracking station communicates the identity information of the transponder as well as information on the position and/or the identity of the tracking station to a central station. On the basis of these data and/or an overall processing of several tracking packets that were received by several tracking stations with known positions from the same transponder at different times, position tracking can be carried out in the central station. For instance, it can be interpolated between the positions of two tracking stations in order to arrive at an estimate of the position of the transponder. Typically, several tracking stations are fixedly installed along a predefined track. The measured times and/or the positions of the measuring points may also be taken into account in the central station.

Thus, the transponder according to the invention allows for simultaneous timing and position tracking in a single device. In comparison with previous systems, no additional device needs to be carried for position tracking since the functionalities of timing and position tracking are combined. In other words, the mobile transponder is a traditional transponder for timing with an integrated function for position tracking. This results in advantages regarding handling, costs, and convenience for organizers and participants. In particular, the transponder and the system according to the present invention present a unique solution to the problem of position tracking under the real-life challenges at a sports event.

The additionally required tracking stations may have a simpler, more cost-effective and more robust design in comparison with conventional measuring points for timing. A tracking station can be placed inconspicuously along a previously known track and can carry out position tracking unsupervised and at a negligible risk of loss. The tracking stations can be placed along the track quickly and efficiently so that substantially fewer personnel are needed than for the installation of measuring points. Usually, no intervention is necessary while the event is ongoing. The position tracking approach according to the invention thus allows for efficient and easy handling during installation and dismounting and during running of an event.

The tracking mode, in which a message is transmitted periodically and in which energy consumption is thus comparatively high, is systematically activated by the activation information when a measuring point is passed. This results in a reduction of energy consumption in comparison with systems in which the position tracking mode cannot be switched on or off systematically. The battery is only stressed when necessary. It is not necessary for the persons whose positions are to be tracked to carry out the activation by themselves, which they might forget to do. The timing equipment already at hand is used for the activation of position tracking. A transmitter function, as it were, is integrated in a transponder, which transmitter function may be controlled via the timing equipment (e.g. activation/deactivation/configuration).

The transponder according to the invention requires less energy and thus a considerably smaller battery in comparison with prior-art systems (e.g. traditional trackers with a satellite receiver). Thus, the transponder according to the invention may be produced in a lightweight and cost-effective version. The use of a rechargeable energy store is avoided by the systematic activation. In particular, energy consumption is so low that the transponder can be used for several years with only a comparatively small energy source. This leads to advantages regarding robustness, costs, and handling. In particular, the transponder may be constructed to be lightweight, watertight, and robust so that it can, for example, also be used at Iron Man events (i.e. partly under water).

Moreover, a satellite receiver, such as the ones used in conventional GPS trackers, principally does not work, or does not work very well in the inside of buildings as well as in other places with limited GPS reception, e.g. in street canyons, tunnels, caves, canyons, or thick forests. The present invention also allows for position tracking in such environments.

The system concept of the present invention allows for position tracking at relatively little effort for material, installation, and dismounting in comparison with other solutions. Therefore, the system is suitable for transport and mobile use.

The present invention is based on the idea that an infrastructure for timing that is already present (transponder and time measuring points) is also used for position tracking. The used transponders are small and lightweight and have to be carried by the athletes anyhow. The used tracking stations can be realized at considerably less effort and considerably lower costs in comparison with measuring points. Additionally, efficient installation and dismounting is made possible.

According to a preferred embodiment, the reception unit of the transponder is configured to evaluate an inductive field and to receive a message on the basis of a modulation of the inductive field. A measuring point generates an inductive field. Usually, a wire loop is provided for this purpose, which is placed on the ground and crossed by the transponder at passing. This field is modulated. The reception unit of the transponder allows for an evaluation and/or the reception of the inductive field and can at the same time measure a modulation of the inductive field. Following this principle, a transmission of messages can take place depending on the kind of modulation. One advantage of using an inductive field is the relatively low energy consumption of a respective reception unit as well as the relatively high range if enough energy is available for the generation of the inductive field. This is reasonable in the area of sports but also in a number of other areas of application, because the mobile transponder has to be carried along while the measuring point can mostly remain stationary. Another advantage of the transmission of messages via an inductive field lies in the fact that the inductive field drops off at a factor of $1/x^3$, where x is the distance between the transponder and the wire loop; the inductive field is therefore easily spatially definable. The activation of the tracking mode of the transponder can thus be carried out in a precisely defined spatial area. A manual and thus error-prone switch that has to be pressed by the athlete at the start or when passing a start line, respectively, is replaced by a reliable activation of the tracking mode by means of a wire loop on the track, as it were. In other words, this activation corresponds to an automatic on/off switch.

In an embodiment of the mobile transponder, the reception unit is configured as a wake-up receiver for waking the processor from a power saving mode when the message is received. A wake-up receiver comprises a circuit that is configured to at least be brought from a sleep mode with reduced or very low energy consumption to an awake mode with higher energy consumption by means of an electromagnetic or inductive field. With a wake-up receiver it can for instance be made sure with very low energy consumption that a message is received and a wakeup signal is transmitted to a processor for evaluating the message. All in all, this results in considerably reduced energy consumption in comparison with a receiver that has to be ready to receive all the time such that no message is missed.

In a further embodiment of the mobile transponder, the processor is configured to deactivate the tracking mode if the message includes deactivation information;

the message does not include activation information for a first predefined time period; and/or an energy supply of the mobile transponder drops below a predefined threshold. Deactivation of the tracking mode minimizes energy consumption. Deactivation information may be transmitted analogous to activation information in one message of a time measuring point. For example, at passing a measuring point in the finishing area at a sports event, a message with deactivation information may be transmitted. The orientation toward receiving activation information results in a timeout function. If no message with activation information is received for a certain period of time, the tracking mode is deactivated. With the orientation toward an energy supply of the mobile transponder and a threshold value (if, for instance, the battery voltage drops below a voltage threshold), a prioritization of the timing function of the transponder over the position tracking function of the transponder may be obtained. Even if the energy is no longer sufficient to ensure position tracking, timing can still be carried out. The mentioned possibilities of deactivating the tracking mode may each be used on their own but also in combination. This leads to the advantage that the energy consumption of the mobile transponder is kept at a minimum and may, in particular in comparison with previous solutions, be reduced considerably. Preferably, the tracking mode is optional and is only active during an event at which position tracking of the participants is desired.

In a further embodiment, the tracking packet includes numbering information for temporal indexing to distinguish the tracking packet from other tracking packets. This numbering information may in particular be a consecutive number that is incremented in successively transmitted tracking packets of the same transponder. This makes it possible to register a double detection of the same tracking packet by several tracking stations. If the transponder is in the reception area of two tracking stations, it may happen that both tracking stations receive the same tracking packet, possibly at slightly different times of receipt. If both tracking stations then pass on identity information from the tracking packet to a central station for further processing, collisions and wrong allocation may occur. Numbering information may be used to avoid this. The numbering information may be a time stamp or a simple consecutive number. The tracking stations forward numbering information as well as identity information and position information to the central station in one single detection packet. The use of numbering information further improves position tracking or precision of position tracking, respectively. Wrong allocations are avoided.

In a further embodiment, the transmission unit is configured as a transceiver, in particular as a radio transceiver, for receiving an acknowledgment of receipt after transmission of the tracking packet and after forwarding of the passing time. The bidirectional communication of a radio transceiver allows for acknowledgments of receipt to be received. With an acknowledgment of receipt, it can be ensured that a transmitted message has been received. On the basis of this information, further information processing may be carried out. For instance, it can be refrained from transmitting the same information twice. Packet losses often occur with wireless data transmission. These packet losses are prevented by repeated transmission of the same information. The use of acknowledgments of receipt allows for these redundant transmissions to be dispensed with, which leads to a reduced need for communication and thus a reduced need for energy. The message may also be stored in a memory for later transmission if no acknowledgment of receipt is received. It can thus be made sure that no data is lost. This is particularly relevant when many messages emerge, as may happen in a start and/or finishing area of a mass sports event.

In a further embodiment, the processor is configured to deactivate the tracking mode if no acknowledgment of receipt is received for a second predefined time period after the transmission of the tracking packet. A further possibility for additional energy saving may be based on the reception or non-reception, respectively, of acknowledgments of receipt. If the transponder is in an area without any tracking stations and thus does not receive any acknowledgments of receipt in response to transmitted tracking packets, the tracking mode and the periodic transmission of tracking packets may be deactivated after a certain period of time. This may lead to further energy saving.

In an embodiment of the system according to the invention, the at least one measuring point comprises a first measuring point for transmission of a message with timing information to the transponder when the first measuring point is passed, and a second measuring point for transmission of a message with activation information to the transponder when the second measuring point is passed. It is possible that one message each is transmitted at two different measuring points, wherein the first message at the first measuring point includes timing information and wherein the second message at the second measuring point includes activation information. When separate measuring points for timing and for activation of the tracking mode are used, the time measuring system may be installed more easily and more quickly. Often, unskilled personnel is used for this purpose. Simplified installation with unambiguous assignment of functions may, for instance, be realized by multi-color labelling.

In a further embodiment of the system, the at least one measuring point comprises at least one of the following units: an induction loop for wireless transmission of messages via an inductive field; and a wireless interface for wireless reception of the passing time and/or of status information describing a status of the tracking mode of the transponder. Communication from the measuring point to the transponder is carried out via the induction loop. It can thus be achieved that communication is spatially limited. In comparison with radio communication, an induction loop for the generation of an inductive field can be aligned such that the inductive field is only generated in a defined, or comparatively clearly definable, area. Only in this area the transponder, or the reception unit of the transponder, respectively, can receive the message so that timing and activation of the tracking mode take place at a position defined as precisely as possible. Thus, precision of timing is increased and/or the tracking mode is only activated if the measuring point is actually passed so that faulty coincidental activation is avoided. The wireless interface for receiving the passing time ensures that the passing time can be transmitted from the transponder to the measuring point even if the transponder is no longer in the immediate area of the inductive field. This increases reliability of data transmission. In addition, status information may be received via the wireless interface. Activation or de-activation and/or the current activation status of the tracking mode is shown in the status information. This information may be used for monitoring in how many transponders position tracking has been activated and/or deactivated successfully, which is of interest in the position tracking of emergency crews, for example. It is understood that, in this case, the transponder or the transmission unit of the transponder, respectively, is suitably configured for the transmission of status information. Status information is usually determined by the processor and may be transmitted in a separate data packet or in one data packet together with the passing time.

In an embodiment, the central station is configured to evaluate several detection packets and to interpolate the position information in the several detection packets. For example, the central station may determine the position of a mobile transponder as a mean value, for example on the basis of temporal weighting, of positions in consecutive detection packets. In the detection packet, information of a tracking packet received at a tracking station, i.e. identity information of a transponder, as well as the position of the receiving tracking station are initially transmitted to the central station. In an embodiment, the detection packet also includes signal strength information of the tracking packet. If a tracking packet is received at several tracking stations, all concerned tracking stations initially transmit the detection packet to the central station. The signal strength information of the tracking packet can then be used at the central station to be able to allocate the data to the tracking station that was closest to the location of the transponder at the time the detection packet was transmitted. Position tracking is improved.

In a further embodiment, the tracking station is configured as a stationary tracking station. This stationary tracking station may, for instance, be placed along the track before a sports event starts. During the sports event, the position of the tracking station is then left unchanged. This may make processing of the data in the central station easier. It is also possible to reduce the amount of transmitted data, for instance by transmitting reduced position information that is limited to binary information as long as the position of the tracking station remains unchanged.

In a preferred embodiment, the tracking station comprises at least one of the following units: a position unit, in particular a GPS, Galileo or GLONASS receiver, for determining a position of the tracking station; a mobile radio unit for forwarding the detection packet to the central station; a transceiver unit for bidirectional communication with the transponder; a time base for determining a time of receipt of the received tracking packet; and a cache memory for storing the received tracking packet. The position unit may in particular comprise a satellite position unit. By evaluating satellite signals, an exact localization can be obtained without the use of further infrastructure and without manual intervention. The forwarding of the detection packet may be carried out with the help of a mobile radio unit, for example via the GSM network. A transceiver unit in particular corresponds to a radio unit. The time base in particular corresponds to a clock, which may for example be synchronized with the satellite receiver (e.g. GPS time). High-precision timing is thus achieved. With a cache memory for storing the received tracking packets it can be achieved that the effort for forwarding the received packets is reduced since several received tracking packets or the identity information included therein, respectively, may be transmitted collectively in one detection packet. This reduces the communication overhead.

Preferably, the transponder and the system of the present invention are used for timing and position tracking of participants at a sports event. In this field, no comparable systems are known, and the advantages of the present invention regarding energy saving and simple handling can come into their own. However, it is understood that the present invention is not limited to this field of application and may also be used in other fields.

It is understood that the features mentioned hereinbefore and those to be commented on hereinafter may be used not only in the specified combination but also in other combinations or in isolation without departing from the scope of the present invention.

BRIEF DESCRIPTION OF THE DRAWINGS

The invention is described and explained in more detail by means of a number of selected embodiments in connection with the enclosed figures hereinafter. In the following drawing.

DETAILED DESCRIPTION

Figure 1:
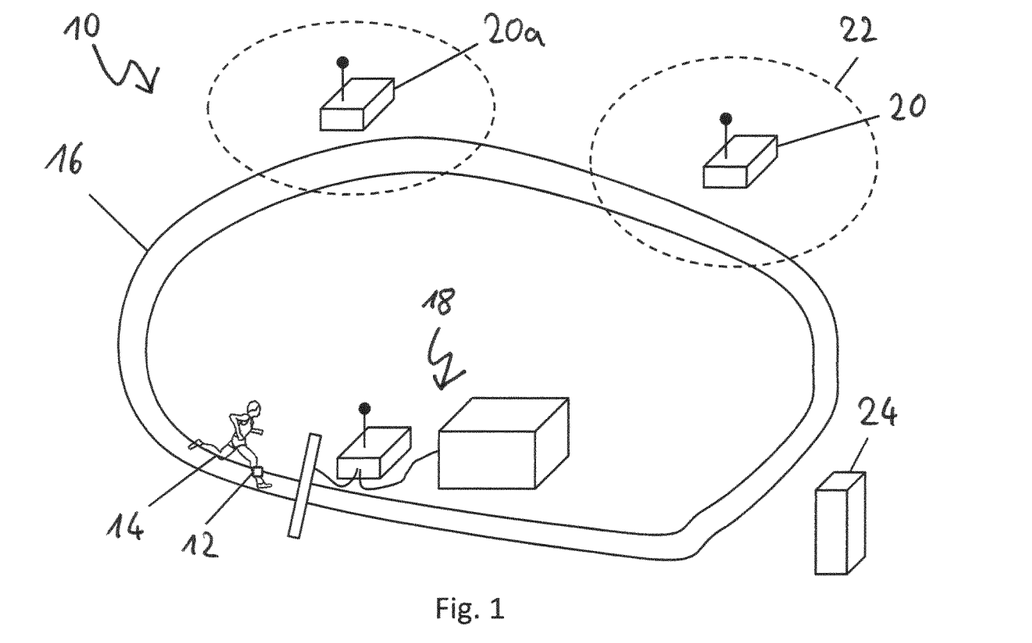
FIG. 1 shows a schematic view of a system according to an aspect of the present invention.

FIG. 1 shows a schematic view of a system 10 for timing and position tracking according to an aspect of the present invention. The system 10 comprises a mobile transponder 12. In the illustrated example, the transponder 12 is carried by a runner 14. The runner 14 moves along a predetermined track 16. According to the invention, timekeeping for recording a start, finish, and/or split time on the one hand as well as position tracking of the runner 14 on the other hand shall be made possible.

For this purpose, the system 10 comprises a measuring point 18. When the measuring point 18 is passed, at least one message is transmitted from the measuring point 18 to the mobile transponder 12. On the basis of the transmitted message, timing can be performed. This timing is based on the determination of a passing time of the transponder, i.e. the point in time at which the transponder 12 is at or very close to the measuring point 18.

Furthermore, the transponder 12 can be brought into a tracking mode when it passes the measuring point 18. In this tracking mode, the transponder transmits tracking packets (also called tracking pings) at regular intervals. These tracking packets are received by a tracking station 20 when the transponder 12 is within a communication radius 22 of the tracking station 20 (or when the tracking station is within a communication radius of the transponder). For this purpose, the tracking station 20 is positioned along the track 16, wherein the communication radius 22 of the tracking station 20 covers part of the track 16. As shown, the system 10 typically comprises at least one further tracking station 20a, which is also positioned along the track 16 and is configured to receive the tracking packets of the transponder 12. The tracking station 20 has a known position.

When the transponder 12 along the track 16 comes within communication radius 22 of the tracking station 20 (or when the tracking station is within communication radius of the transponder), the tracking station 20 receives the tracking packet periodically transmitted by the transponder 12. When the tracking station 20 receives a tracking packet, it forwards it, or, respectively, the identity information of the transponder included therein, together with its own position as a detection packet to a central station 24, for example via a mobile radio network.

The central station 24 receives the detection packet and, on its basis, determines a position of the transponder 12 at a certain time. Thus, in the central station 24, an overview of the present state of the race is determined on the basis of data received from at least one tracking station. In the simplest case, it can be assumed that the transponder 12 was at the position of the tracking station 20 when the tracking station 20 received the tracking packet. Position tracking takes place, as it were, based on the assumption that the transponder is at the position of the tracking station when the tracking station is able to receive a tracking packet. The determination of the position at a given time forms the basis for position tracking. When the central station 24 receives several detection packets from the transponder 12, for example a first detection packet from the tracking station 20 and a second detection packet from the tracking station 20a, the position of the transponder 12 may, for example, be determined by interpolation between the two positions. Usually, a plurality of tracking stations is placed along the track 16. The runner passes one tracking station after the other with his or her transponder 12. Assumptions on the speed of the runner can then be made so that an estimate of the position in real time is made possible. Standard algorithms of localization and position tracking can be used for this purpose.

Actual localization of the transponder 12 is carried out on the basis of the limited range of the radio signal that is exchanged between the tracking station and the transponder. This range lies, for example, in the region of <50 m. This as well as the number of tracking stations leads to an accuracy and/or a position resolution of position tracking that is usually below the accuracy and/or position resolution of a GPS tracker but that is sufficient for the application at sports events. It is noted in this regard that the accuracy of conventional GPS trackers is not considerably higher since, for the purposes of energy saving, these trackers oftentimes are only activated once a minute, which lowers position resolution to a comparable level.

The central station 24 may, for example, be designed as a server in a network or on the Internet. The central station may also be integrated in a measuring point as an information collecting point. For example, the central station may be integrated in the evaluation unit of a measuring point. The central station has communication means for communication with the measuring points and the tracking stations, for example via a mobile radio link. In addition to the detection packets of several tracking stations, timing information, which is generated by several measuring points on the basis of the passing times of the passing transponders and is communicated to the central station, is usually also processed in the central station. Organizers, spectators, and athletes may have access to the data determined in the central station. For example, a visualization on a big screen is possible.

The present invention in particular relates to the area of timing and position tracking at sports events, for example triathlon, Iron Man, long-distance bicycle races (e.g. Race Across America), cyclo-cross, biathlon, cross country skiing or others. An application in further fields such as inline skating, BMX, mountain biking, speed ice skating, motocross, running, motor sports, cycling is conceivable. As an example, FIG. 1 shows an application in the area of running. A running circuit is shown by way of example. It is understood that the present invention can also be used for tracks where the start and finish lines are not at the same position. In the example shown, there is only one measuring point. Typically, several measuring points are provided. For timing, for example, there are separate measuring points at the start and finish lines. In addition, further measuring points are provided at regular intervals as split time measuring points. Additionally, a plurality of further tracking stations may be present. If the track is known, this information can be utilized for position tracking so that precision can be enhanced. However, it is understood that a known track is not a prerequisite for position tracking.

Figure 2:
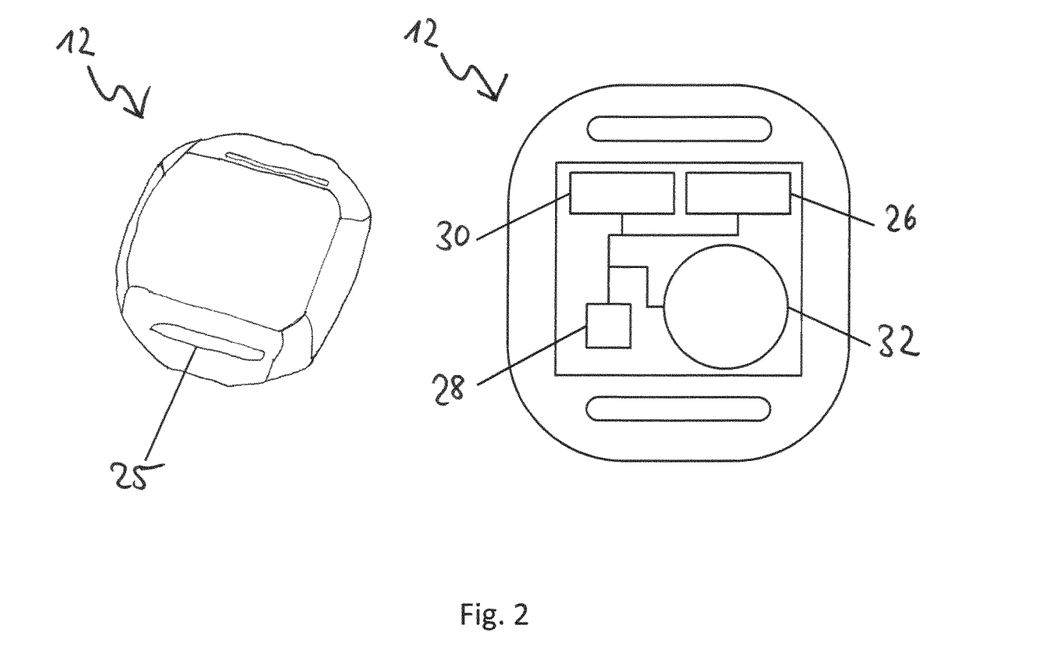
FIG. 2 shows a view of a transponder according to an aspect of the present invention in a perspective and a schematic view.

FIG. 2 shows a schematic view of a transponder 12 according to an aspect of the present invention. A perspective front view is shown on the left side of FIG. 2. On the right-hand side of FIG. 2, the different components are shown in an enlarged schematic sectional view. The transponder 12 is usually carried by the athlete (for example at running events etc.) or is attached to the sports equipment (for example at go-kart races etc.). In the illustrated example, eyelets 25 for receiving an elastic tape to be fixed to an arm or a leg of the athlete are provided for this purpose. A fixation with adhesive tape, magnets, screws, etc. is also conceivable.

The transponder 12 comprises a reception unit 26 for receiving at least one message from a measuring point when the measuring point is passed. The reception unit 26 is preferably designed for receiving a modulated inductive field and for this purpose comprises at least one antenna (coil). In particular, three antennae (coils) that are arranged orthogonal to each other may be provided, by which three antennae a signal can be received. The presence of three orthogonal antennae compensates for and/or reduces the influence of the position of the transponder relative to the inductive field. The reception unit 26 is preferably configured as a wake-up receiver and can, with the help of an inductive signal, bring the transponder or the processor, respectively, from a battery-saving mode (battery lifespan of several years) into an active mode. In particular by making use of this principle, the tracking mode may be activated. It is also possible to configure the transponder with the help of the inductive signal. For example, parameters of the tracking mode, such as a time period for the periodic transmission of tracking packets, may be configured. It is also possible for the tracking mode to be completely deactivated for certain events and/or for certain transponders in order to preserve the battery. Thus, in the course of the activation of the tracking mode, further "commands" could be transmitted to the transponder. Hereby, a fast tracking mode with a high frequency of transmitted tracking packets and a slow tracking mode with a lower transmission frequency could for example be realized in order to allow for high speeds on the one hand and to provide a long battery life on the other. Accordingly, the on/off switch realized by the activation information could be replaced by a fast/slow/off switch, as it were. Other similar configurations are possible.

The transponder 12 further comprises a processor 28 for evaluating the messages received from the reception unit 26. In particular, a standard low energy microcontroller may be used as processor. The processor 28 is configured to determine whether the message includes timing information and/or activation information. If timing information is included, a passing time of the measuring point is calculated. For this purpose, the processor 28 may, for instance, evaluate the signal strength of the received message. If the message includes activation information, the processor 28 activates a tracking mode of the mobile transponder 12.

The transponder 12 further comprises a transmission unit 30 for the periodic transmission of a tracking packet if the tracking mode is activated. The tracking packet includes at least one piece of identity information of the mobile transponder 12. In addition, the transmission unit is configured to transmit the passing time calculated in the processor 28. Preferably, the transmission unit 30 is configured as a radio transceiver for bidirectional communication in an ISM frequency band (industrial, scientific, medical), for example in a 2.4 GHz band. Advantageously, the transmission unit 30 is configured to receive acknowledgments of receipt. In particular, acknowledgments of receipt may be received from the measuring point and/or the tracking station. Transmission and reception unit may share one antenna or may have separate antennae. An embodiment as a combined transmission and reception unit is also conceivable. The term periodic transmission herein comprises the transmission at regular intervals (for example at intervals of one second each) as well as the transmission at irregular intervals, for example at stochastically distributed intervals.

The transponder 12 further has a battery 32, which is preferably designed as a button cell battery (coin cell battery). The weight of the battery 32 typically represents a relatively high share in the total weight of the transponder. Thus, it is relevant for a reduction of the transponder's weight that a battery is used that is as light and/or as small as possible; it is therefore advantageous that all components of the transponder 12 use up as little energy as possible. Preferably, the battery 32 is not rechargeable. It is thus avoided that contacts or plugs need to be provided at the housing of the transponder 12, which contacts or plugs might possibly have an impact on the watertightness and/or the robustness against environmental influences. In addition, mechanical robustness is increased and manufacturing costs are minimized.

The transmission unit 30 has a comparatively high energy demand when messages are transmitted and received. By the targeted activation of the tracking mode at the passing of a measuring point at which a message with activation information is received, it can thus be achieved that the tracking mode is activated exactly at the time when it is needed and desired. This preserves the battery of the mobile transponder. Advantageously, a possibility for automatic deactivation of the tracking mode by the processor is also provided. For example, it is possible to activate the tracking mode at the start of a race and to deactivate it again when the finish line is crossed.

For deactivating the transmission unit 30, on the one hand the available energy or the voltage provided by the battery 32, respectively, may be monitored by the processor 28. As soon as the battery runs low, i.e. the battery voltage drops below a predefined threshold value, the tracking mode may be deactivated to save energy. This is particularly relevant for applications where timing is to be prioritized over position tracking. At a sports event, timing of the participants is typically more important than position tracking, which oftentimes merely serves as additional information. The automatic deactivation of the tracking mode based on the available energy supply allows for the timing mode to remain functional. On the other hand, it is, alternatively or additionally, possible that the tracking mode is automatically deactivated after a predefined time span in which no activation information is received by the processor. A kind of timeout function can be obtained in this manner. For example, the tracking mode may be automatically deactivated after a few hours, for instance three hours, in which no activation information is received, in order to ensure an automatic deactivation after the completion of the sports event. Lastly, it is possible that a maximum time span is defined since a tracking packet has last been successfully transmitted to a tracking station. Usually, depending on the number and/or the closeness of tracking stations along the track, in most cases no acknowledgment of receipt is received in the transponder in response to a transmitted tracking packet since no tracking station is within communication range. If an acknowledgment of receipt from a tracking station is received in response to the transmission of a tracking packet, this information is preferably used for resetting a time span for deactivation of the tracking mode (and/or for restarting a counter). If, for a predefined time span, no acknowledgment of receipt is received from a tracking station, the tracking mode is automatically deactivated by the processor. It is also possible that deactivation automatically occurs after a predefined maximum time span in the tracking mode.

By using a combination of several approaches for deactivating the tracking mode, it can be ensured that the tracking mode is definitely deactivated after the transponder has been used so that the battery is preserved. Deactivation also takes place if the measuring point at the finish line has not been passed. In addition, a combination of the above approaches for deactivation makes it possible to compensate for handling errors on the part of the organizers or the participants of the sports event. In practice, it is often the case that the transponders are stored in the same place as the dismantled measuring points. If it should then be forgotten to deactivate one of the tracking stations, so that an acknowledgment of receipt is received in response to each tracking packet of the non-used transponders, a deactivation of the tracking mode is made sure nonetheless by the timeout function.

It is understood that the transponder 12 may comprise further units such as an internal time base, a memory for storing several passing times or an energy saving unit. It is possible that some of the above-mentioned units of the transponder may occur in combination in various forms or that the functions of one unit are partly or fully taken over by other units.

Figure 3:
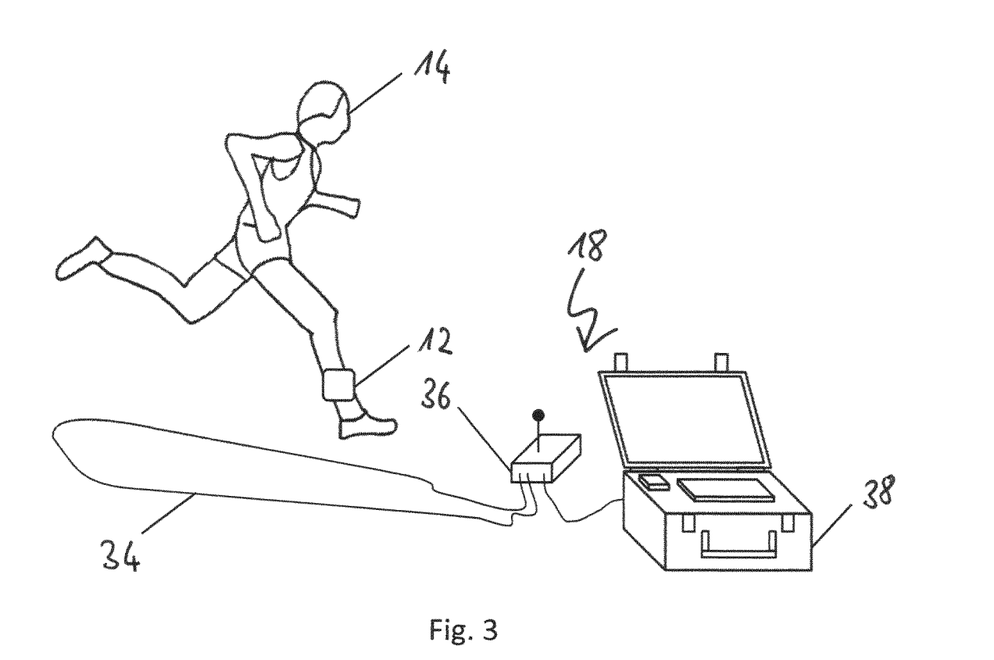
FIG. 3 shows a schematic view of a measuring point in a system according to the present invention.

In FIG. 3, the situation at a measuring point during a running event is schematically illustrated. An athlete 14 carries a transponder 12 according to the invention. The transponder 12 may, for example, be fastened to the ankle of the runner 14 with an elastic tape. The athlete 14 moves in the vicinity of a measuring point 18. In the example shown, the measuring point comprises an antenna 34 and a read-out unit 36 for the communication of the data. In the illustrated example measuring point 18 further comprises an evaluation unit 38 for further processing of the measured times. The evaluation unit 38 is connected with the read-out unit 36. In other embodiments, read-out unit 36 and evaluation unit 38 may also be designed in the form of a combined unit.

The antenna 34 is arranged on the ground and may, for instance, be placed inside a floor cable channel that runs orthogonal to the track. The depicted antenna 34 corresponds to a simple wire loop for generating an inductive field. This wire loop may be placed across the track. Other arrangements of the antenna 34, for example along the side of the track or in a bridge over the track, are also conceivable. An inductive field is generated above the antenna 34. Thus, the antenna corresponds to an induction loop. The field is mostly oriented to the top, in the direction of the passing runner 14. It is possible for the transponder to pass the wire loop at heights of up to several meters above the wire loop and still receive a message. In a preferred embodiment, a modulated inductive field is generated at 125 kHz. The transponder 12 or the reception unit 26 in the transponder 12, respectively, is configured to register this field.

Depending on how long the transponder 12 remains within the field, there are mostly several so-called detections, which correspond to messages that the transponder 12 receives. On this basis, a passing time of the measuring point 18 can be calculated. The passing time corresponds to the point in time at which the runner 14 is directly above the antenna 34. This passing time can be precisely determined in the processor of the transponder 12 with the help of an algorithm. The calculation may be made, for instance, on the basis of signal strengths or field strengths, respectively, of the inductive field, which occur at one or several multi-directional antennae in the transponder, and/or on the basis of further parameters. Based on the signal strength, a minimal distance between transponder and measuring point is determined, as it were. For example, if several messages are received, a counter number or a time of receipt of the message that was received with the highest signal strength may be considered to represent the passing time. The passing time thus corresponds to the moment at which the transponder 12 moves across the measuring point 18. Thus, the passing time refers to a time base of the transponder. The passing time is transmitted to the measuring point 18 with the help of the transmission unit of the transponder 12.

Figure 4:
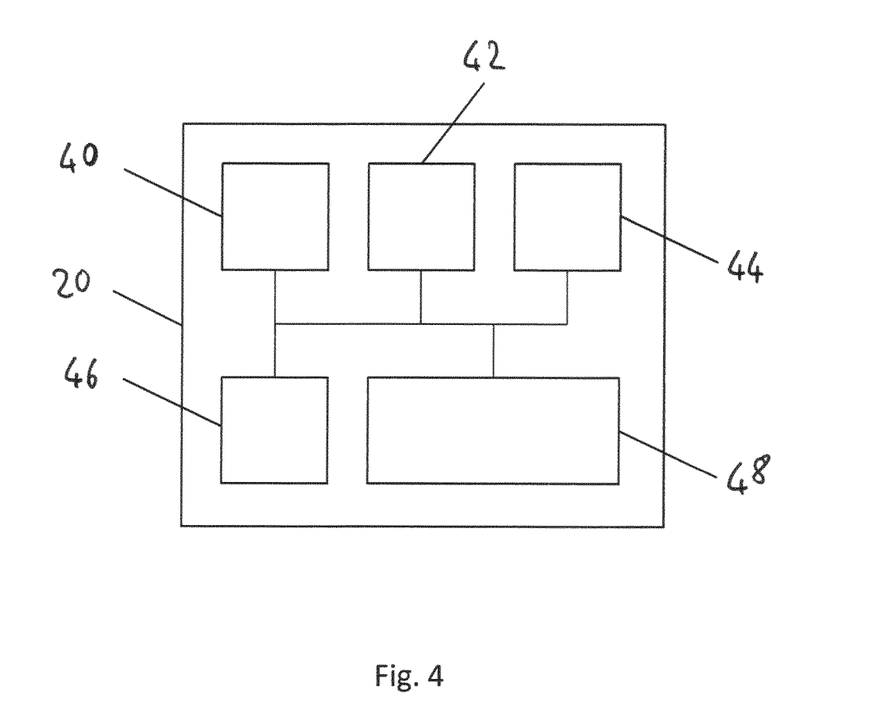
FIG. 4 shows a schematic view of a tracking station in a system according to the present invention.

In FIG. 4, a tracking station 20 is schematically illustrated. The tracking station comprises a position unit 40. The position unit 40 serves to determine the position of the tracking station 20. In particular, a GPS receiver may be provided. Furthermore, the tracking station 20 comprises a mobile radio unit 42 for communication of the detection packets to the central station. Position information of the tracking station, i.e. the current position of the tracking station, is added to the received tracking packets here. The mobile radio unit 42 may in particular be designed as a GSM module for mobile communication. Alternatively, the connection may be established wirelessly by a WLAN or wire-bound by a LAN/Powerline/DSL.

The tracking station 20 further comprises a transceiver unit 44 for communication with the transponder. In particular, the transceiver unit 44 may be designed as a 2.4 GHz radio module for bidirectional radio communication. The tracking station 20 normally comprises an internal time base 46. The time base 46 serves to determine a time of receipt (time stamp) of a received tracking packet. Advantageously, the time base 46 is synchronized with a satellite time (GPS time) at regular intervals in order to ensure high precision. Typically, the tracking station 20 further comprises a cache memory 48, which may, for instance, be designed as a flash memory, for storing the received tracking packets. On the one hand, this leads to more efficient communication as several tracking packets are combined into one detection packet. On the other hand, higher reliability of transmission can be ensured. The respective time of receipt (time stamp) of each received tracking packet is stored in the cache memory 48.

It is understood that the tracking station 20 mostly comprises further units such as a processor for controlling the different units as well as an energy store, which allows for mobile use. Advantageously, the tracking station is integrated in a water-tight and robust housing.

Depending on the field of application, the tracking station 20 is preferably configured as a stationary station. For instance, at a marathon or other running event, a plurality of stationary tracking stations may be placed along the track. Stationary is to be understood to mean that the tracking station does not move along the tracks during an event. The tracking stations are typically positioned before the event starts. On the one hand, it is possible to manually initialize the tracking stations with a certain position; on the other hand, an automatic localization by an integrated position unit is possible. The number and closeness of the placed tracking stations is significant for the precision of position tracking in the central station.

Figure 5:
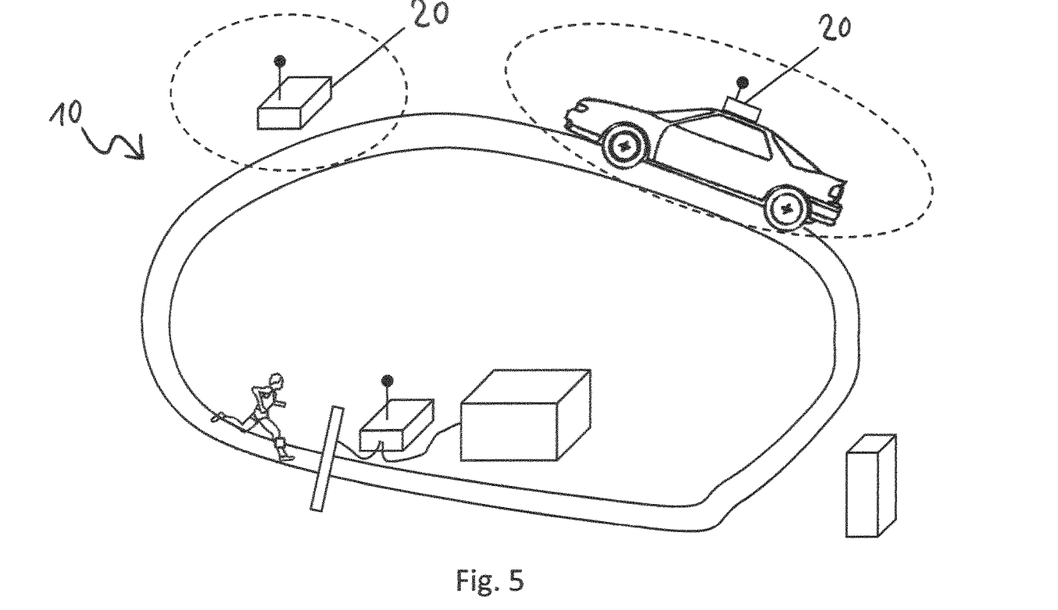
FIG. 5 shows a view of a system according to an aspect of the present invention with a mobile tracking station.
Figure 6:
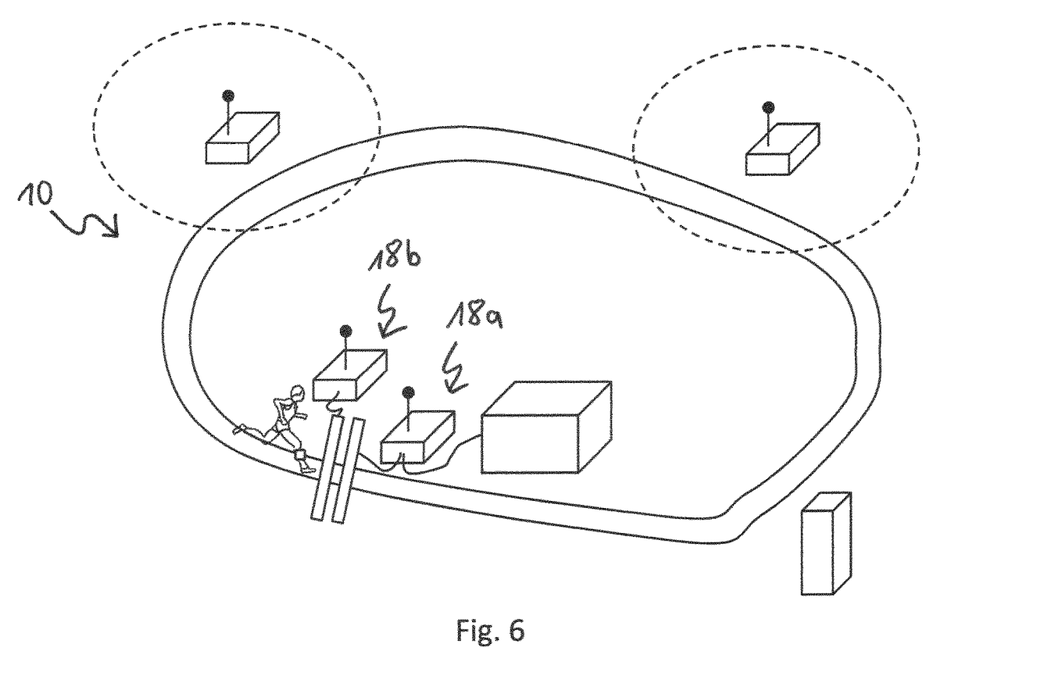
FIG. 6 shows a schematic view of a system according to the invention with a first measuring point for transmission of activation information and a second measuring point for transmission of timing information.

Alternatively, it is also possible that one or several tracking stations are configured as mobile stations. FIG. 6 shows the alternative embodiment of a tracking station 20 as a mobile tracking station. For example, a tracking station with a GPS receiver may be fixed to the roof of a pace car at a cycle race. It can thus be monitored continually which cyclists are currently in a leading group. As shown, it is possible that one or several stationary tracking stations 20 interact with one or several mobile tracking stations 20 in the system 10.

It is also possible that several tracking stations are not placed along a predefined track but are scattered randomly over a certain area in order to make position tracking possible in this area.

In FIG. 6, a system 10 according to the invention is shown in which a first measuring point 18a for the transmission of a message with timing information and a second measuring point 18b for the transmission of a message with activation information is provided. It is generally possible that activation information and timing information are transmitted by a measuring point in one (combined) message. It is also possible that a message with timing information and another message with activation information is transmitted at a measuring point. Lastly, as shown in FIG. 6, it is possible that different messages are transmitted at two measuring points 18a, 18b. As the functions are independent of each other, the order in which the measuring points 18a, 18b are crossed by the runner is not relevant. The two measuring points 18a, 18b may essentially be designed identically for the transmission of different messages. In the illustrated example, the measuring point 18a has separate evaluation and read-out units, while the measuring point 18b is only connected to a read-out unit. Other combinations are possible.

The application of systems for timing often requires an assembly and dismounting of measuring points that is as efficient as possible (for example at one-day running events). It is not always possible to deploy trained personnel for assembly and dismounting. Splitting up the transmission of timing information and the transmission of activation information between two different measuring points may lead to a simplified assembly of the system. Moreover, it can be signaled to the participants that, from a certain point onwards, position tracking is also carried out. Typically, the measuring points 18a, 18b are placed next to one another. However, it is also possible that position tracking is only provided for part of the track and that the measuring point 18b, at which the tracking mode is activated, is therefore positioned at the beginning of this section.

Figure 7:
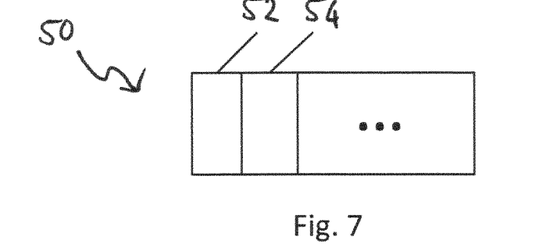
FIG. 7 shows a schematic view of a message that is received by a mobile transponder according to the invention when a measuring point is passed.

In FIG. 7, an example for a message 50, as it is transmitted from a measuring point to a mobile transponder when the measuring point is passed, is schematically illustrated. The message 50 may include timing information 52 and activation information 54. The activation information 54 may preferably correspond to a 1-bit information which signals if the tracking mode is to be activated. The timing information 52 may also correspond to a 1-bit information. As shown in the example, it is possible that the message 50 includes activation information 54 as well as timing information 52. It is also possible that the message 50 includes only activation information or only timing information. It is further possible that the message itself is used for determining the passing time of the measuring point, i.e. that the presence of the message alone is assessed as timing information irrespective of the contents of the message and irrespective of whether or not activation information is also included. It is also possible that a message with activation information has a different set-up than a message with timing information and that the messages are transmitted separately.

Figure 8:
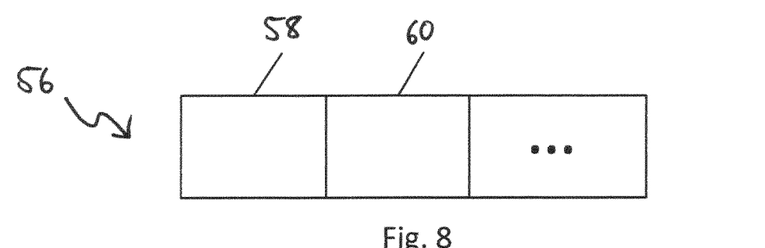
FIG. 8 shows a schematic view of a tracking packet that is periodically transmitted by a mobile transponder according to the invention in the tracking mode.

In FIG. 8, an example for a tracking packet 56 is shown schematically. The tracking packet 56 is transmitted by the transponder at adjustable time intervals and includes identity information 58 of the transponder by which the tracking packet is periodically transmitted in the tracking mode. The identity information 58 may for example correspond to a unique 4-byte hardware address (MAC ID). Advantageously, the tracking packet 56 also includes numbering information 60. The numbering information 60 may, for example, be a consecutive number for numbering and distinguishing successively transmitted tracking packets 56 of the same transponder. These consecutively transmitted tracking packets 56 have the same identity information 58. The numbering information 60 helps to avoid conflicts when the same tracking packet 56 is received by several tracking stations.

Figure 9:
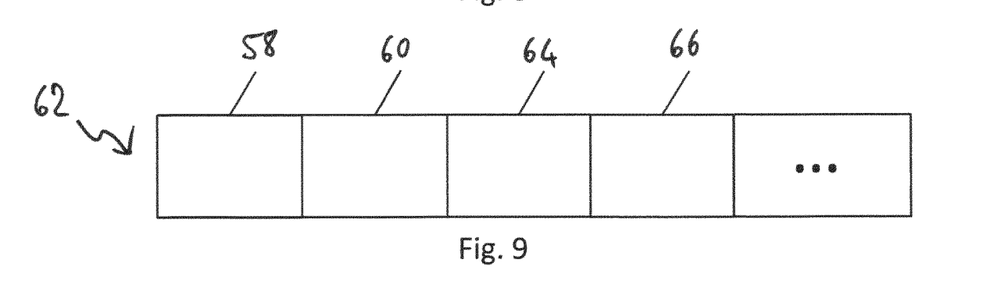
FIG. 9 shows a schematic view of a detection packet that is periodically transmitted from a tracking station to a central station.

In FIG. 9, an example for a detection packet 62 is shown schematically. The detection packet 62 is forwarded from a tracking station to the central station. The detection packet is usually assigned to a tracking packet and includes identity information 58 as well as numbering information 60 of this tracking packet. The detection packet 62 further includes position information 64 of the tracking station. The position information 64 includes the position of the tracking station. For example, GPS coordinates may be transmitted as position information 64. It is also possible that a unique identification, for example an ID, of the tracking station transmitting the detection packet 62 is transmitted as position information 64. On the basis of this unique identification, an allocation to a position may later be made in the central station. The detection packet 62 further includes signal strength information 66 of the received tracking packet 56, which is transmitted in the detection packet 62. An RSSI value (received signal strength indication) may, for instance, serve as signal strength information 66. Later on, a distance between the transponder and the tracking station at the time of transmission of the tracking packet may for example be inferred from the signal strength information 66. It is also made possible to deal with situations in which the same tracking packet has been received by several tracking stations.

As shown in FIGS. 7-9, the different messages and packets may include further information. It is also possible that several messages or packets are combined so that, for more efficient data transmission, several respective pieces of information are included.

Figure 10:
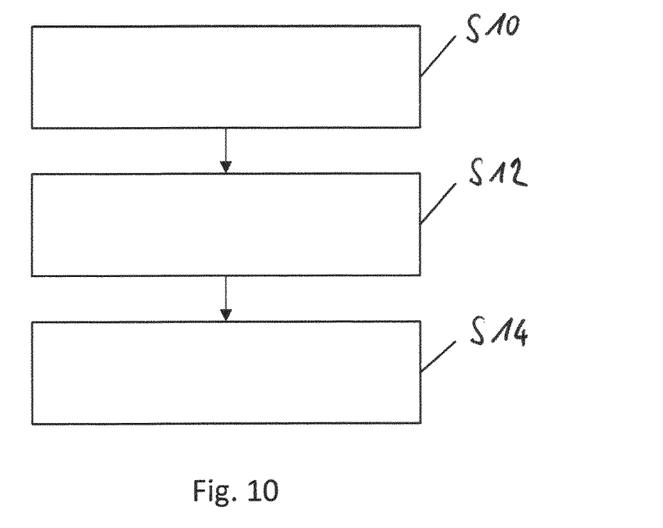
FIG. 10 shows a schematic view of a method according to an aspect of the present invention.

In FIG. 10, a method for timing at sports events according to an aspect of the present invention is schematically illustrated. Initially, the method comprises a step of receiving (step S10) a message when a measuring point is passed. Furthermore, the method comprises a step of evaluating (step S12) the message. Finally, the method comprises a step of periodically transmitting a tracking packet if the tracking mode is activated, and of forwarding the passing time to the measuring point (step S14).

The method according to the invention may in particular be carried out on a microcontroller in a transponder for the timing at sports events. It is also conceivable to operate another portable device (for example a mobile phone, a smart watch, or a smart wristband, etc.) according to the method described herein. Usually, the single steps of the method are implemented as commands in a computer program.

It is understood that the present invention is not limited to the field of sports timing. Fields of application for the invention can also be found in areas outside the timing at sports events. For example, the present approach may also be used for the monitoring of dementia patients, who are normally not allowed to leave a care facility, for attendance checking or position tracking of firefighters or rescue services in action (for example during an operation inside a tunnel), and for attendance checking at companies, or in other areas. Generally speaking, the present invention may be used for position tracking of larger populations of humans/animals/machines along a more or less clearly defined path or grid. It is understood that the transponder according to the invention is not limited to the use in the timing at sports events.

In particular, the system of the present invention may also be advantageously used in order to monitor firefighters or emergency crews in action. During a firefighting operation, it is necessary that the positions of the single firefighters can be monitored by a senior officer, preferably in real time. An attendance check is also necessary, for example when a burning building is entered or left. Timing corresponds to attendance checking. During rescue operations, an improvement of the logistics may for example be achieved by position tracking of the respective emergency teams and patients. The system according to the invention makes it possible to provide these functions. Further fields of application are conceivable.

The invention has been comprehensively described and explained by means of the figures and the description. The description and explanations are to be regarded as examples and not as limiting the scope. The invention is not limited to the disclosed embodiments. For the person skilled in the art, other embodiments or variations follow from the use of the present invention as well as from a thorough analysis of the drawings, the description, and the following patent claims.

In the patent claims, the words "comprise" and "include" do not exclude the presence of further elements or steps. The indefinite article "a" or "an" does not exclude the presence of a plural. A single element or a single unit may execute the functions of several of the units named in the patent claims. The mere mention of some measures in several different dependent patent claims is not to be understood to the effect that a combination of these measures cannot be used advantageously. A computer program may be stored/distributed on a non-volatile data carrier, for example on an optical memory device or on a solid-state drive (SSD). A computer program may be distributed together with hardware and/or as part of hardware, for example on the Internet or via wire-bound or wireless communication systems. Reference signs in the patent claims are not to be understood as limiting the scope of the invention.

The invention claimed is:

1. A mobile transponder for timing and position tracking, comprising: a receiver for receiving a message when a measuring point is passed; a processor for evaluating the message to activate a tracking mode when the message includes activation information, and to determine a passing time at which the measuring point is passed when the message includes timing information; and a transmitter for periodically transmitting a tracking packet with identity information for reception by a tracking station having a known position within communication range when the tracking mode is activated, and for forwarding the passing time to the measuring point.

2. The mobile transponder according to claim 1, wherein the receiver is configured to evaluate an inductive field and to receive a message on the basis of a modulation of the inductive field.

3. The mobile transponder according to claim 1, wherein the receiver is configured as a wake-up receiver for waking the processor from a power saving mode when the message is received.

4. The mobile transponder according to claim 1, wherein the processor is configured to deactivate the tracking mode when the message includes deactivation information; the message does not include activation information for a first predefined time period; and/or an energy supply of the mobile transponder drops below a predefined threshold.

5. The mobile transponder according claim 1 wherein the tracking packet includes numbering information for temporal indexing to distinguish the tracking packet from other tracking packets.

6. The mobile transponder according to claim 1, wherein the transmitter is configured as a radio transceiver, for receiving an acknowledgment of receipt after transmission of the tracking packet and after forwarding of the passing time.

7. The mobile transponder according to claim 6, wherein the processor is configured to deactivate the tracking mode when no acknowledgment of receipt is received for a second predefined time period after the transmission of the tracking packet.

8. A mobile transponder according to claim 1 wherein the mobile transponder is used for timing and position tracking of participants at a sports event.

9. A system for timing and position tracking, comprising: a mobile transponder comprising;
  a receiver for receiving a message when a measuring point is passed; a processor for evaluating the message to activate a tracking mode when the message includes activation information, and to determine a passing time at which the measuring point is passed when the message includes timing information; and a transmitter for periodically transmitting a tracking packet with identity information for reception by a tracking station having a known position within communication range when the tracking mode is activated, and for forwarding the passing time to the measuring point;
  at least one measuring point configured to wirelessly transmit timing information and activation information in at least one message to the mobile transponders when the at least one measuring point is passed; a tracking station with known position configured to receive the tracking packet from the mobile transponder within communication range and configured to transmit a detection packet with identity information and position information of the tracking station to a central station; and a central station configured to determine a position of the transponder on the basis of the detection packet.

10. The system according to claim 9, wherein the at least one measuring point comprises: a first measuring point for transmission of a message with timing information to the mobile transponder when the first measuring point is passed, and a second measuring point for transmission of a message with activation information to the mobile transponder when the second measuring point is passed.

11. The system according to claim 9, wherein the at least one measuring point comprises at least one of the following units: an induction loop for wireless transmission of messages via an inductive field; and a wireless interface for wireless reception of the passing time and/or of status information describing a status of the tracking mode of the mobile transponder.

12. The system according to claim 9, wherein the tracking station is configured as a stationary tracking station.

13. The system according to claim 9, wherein the tracking station comprises at least one of the following units: a position unit, in particular a GPS, GALILEO or GLONASS receiver, for determining a position of the tracking station; a mobile radio unit for transmission of the detection packet to the central station; a transceiver unit for bidirectional communication with the mobile transponder; a time base for determining a time of receipt of the received tracking packet; and a cache memory for storing the received tracking packet.

14. A system for timing and position tracking according to claim 9 wherein the system is used for timing and position tracking of participants at a sports event.

15. A method for timing and position tracking, comprising the steps of: receiving a message when a measuring point is passed; evaluating the message to activate a tracking mode when the message includes activation information, and to determine a passing time at which the measuring point is passed when the message includes timing information; and periodically transmitting a tracking packet with identity information for reception by a tracking station having a known position within communication range when the tracking mode is activated, and for forwarding the passing time to the measuring point.

16. A computer program product embodied on a nontransitive computer readable medium comprising the steps of: receiving a message when a measuring point is passed; evaluating the message to activate a tracking mode when the message includes activation information, and to determine a passing time at which the measuring point is passed when the message includes timing information; and periodically transmitting a tracking packet with identity information for reception by a tracking station having a known position within communication range when the tracking mode is activated, and for forwarding the passing time to the measuring point.

* * * * *